Nov. 17, 1970   H. RITSCHERLE ET AL   3,541,391
OVERLOAD PROTECTION DEVICE FOR AN ELECTRIC MULTI-RANGE
MEASURING INSTRUMENT
Filed Sept. 20, 1967   3 Sheets-Sheet 1
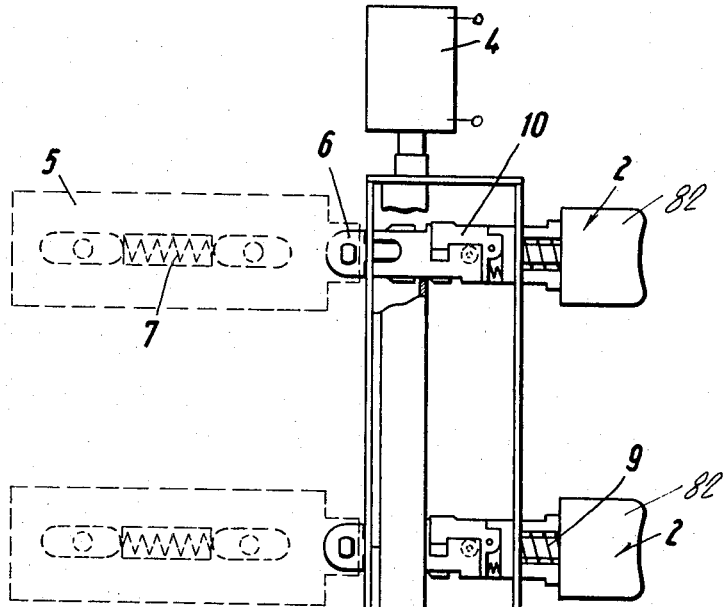
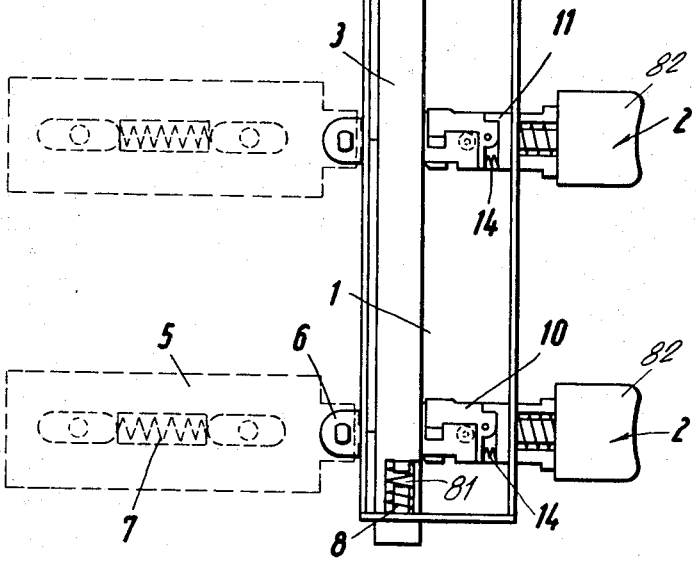
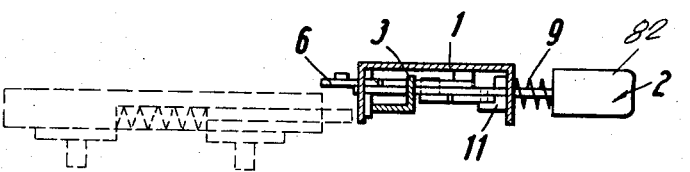
Inventors
HANS RITSCHERLE
HERBERT GARTLER
ATTORNEY

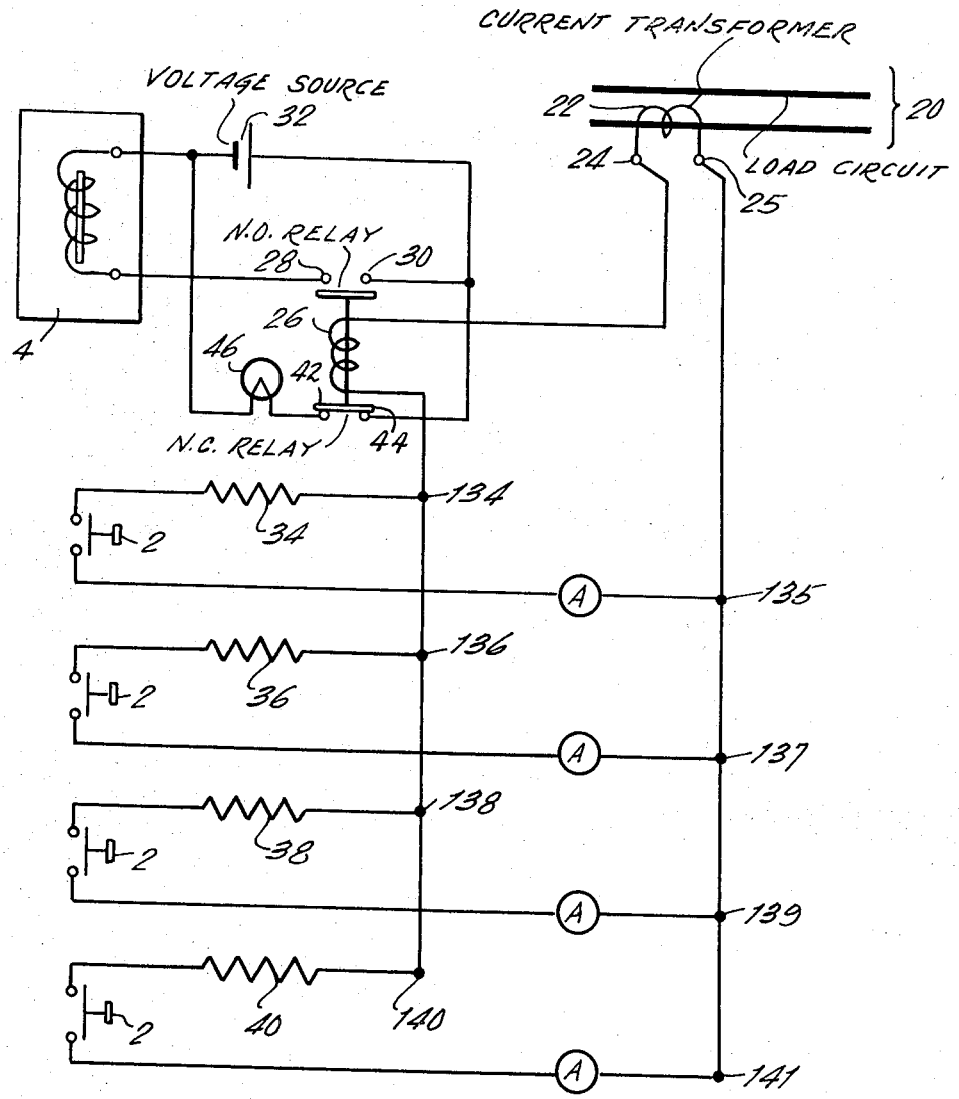

United States Patent Office 3,541,391
Patented Nov. 17, 1970

---

3,541,391
OVERLOAD PROTECTION DEVICE FOR AN ELECTRIC MULTI-RANGE MEASURING INSTRUMENT
Hans Ritscherle, Mannheim, Germany, and Herbert Gartler, Vienna, Austria, assignors to Brown, Boveri & Cie A.G., Mannheim-Käfertal, Germany, a corporation of Germany
Filed Sept. 20, 1967, Ser. No. 698,995
Claims priority, application Germany, Sept. 23, 1966,
B 89,048
Int. Cl. H02h *3/00;* G01r *1/36*
U.S. Cl. 317—9                  10 Claims

ABSTRACT OF THE DISCLOSURE

Overload protection device for an electrical multi-range measuring instrument having several measuring ranges which are switched on by selector switches. The individual measuring-range switches select the respective measuring range and are graduated and so arranged and connected that cut-off takes place upon overloading of the switch of a respective measuring range. By means of a tripping magnet (4) the respective switch (5) is moved to "off" position when overload occurs. The magnet (4) is supplied with current from a current source and controlled by means of an accessory circuit which utilizes a current-actuated relay locked into the tripping magnet (4). When a response occurs in a particular measuring range the tripping magnet releases an interlock between the switches so that only one range at a time is actuated. A signal is also provided to indicate when a cut-out has taken place.

---

The present invention relates to an overload protection device for an electrical multi-range measuring instrument several measuring ranges which are switched on by means of sequencing switches or selector switches.

The use of electrical multi-range instruments of the prior art requires of the user a high degree of skill and attention in order to avoid overloading of the measuring systems. Thus, there has been a number of endeavors to find means for protecting the measuring system as well as the accompanying series-resistances and shunt-resistances from overloading, by means of various protective devices.

These known devices, however, were limited to the area of single measuring devices and have been usually provided with sensitive cut-out mechanisms which respond to an overload or excess current, but they have the disadvantage that, following the response of the overload protection device, the measuring system is separated from the current source. As a protection against adverse currents, fuses have been preferably used, and in critical cases, also overload relay and protective relays, of many types.

This overload protection of the prior art applies only to single devices and cannot be used for electrical multi-range measuring instruments. Measuring instruments which are predominantly equipped with several voltage paths and several current paths, as well as, in some cases, with terminals for resistance measuring, are switched off or cut out, by means of switches wherein the overload protection remains in the circuit of the measuring system.

In circuits of measuring instruments which begin to indicate through a sequence of key depressions, and whose indication is initiated by a sequence of depression of keys and which usually require various measuring ranges, the tripping devices must be exchanged at the moment of an inadmissible excess of current at a particular measuring range in order to effect, automatically, a cut-out or a change-over switching to the next higher measuring range. In view of the means required for each such change of the measuring range, such instruments are very complicated and expensive and therefore disadvantageous. This applies particularly to multi-range instruments whose input measuring paths refer to a common potential.

The present invention starts from the above-described state of the art and relates to the use of a digital indicating multi-range measuring instrument whose measuring ranges usually have several inputs, galvanically separated from each other, with mechanical mutually interlocked range selector switches.

It is therefore an object of the present invention to eliminate the above-described disadvantages and to produce with little expenditure, a multi-range measuring instrument which is provided, in a favorable manner, with an overload protection which accomplishes the necessary cut out for each measuring range, without any special manipulation.

Another object of the invention is to provide overload protection means for an electric multi-range instrument having a plurality of different measuring ranges connected by selector switches wherein the protection means cut out the respective switches of the corresponding measuring range at an overload of that measuring range, and wherein an indicator is provided to show that the cut-out of the respective range has taken place.

A further object of the invention is to provide mechanically mutually interlocked depressible key switches which are assembled to serve as selector switches for a plurality of measuring ranges in an electric multi-range measuring instrument, and wherein a depressed key switch is released upon occurrence of an overload of a respective measuring range and the corresponding current input to that measuring range is disconnected.

Still another object of the invention is to provide latching rail means for mechanically holding and releasing individual key switches of a key switch assembly in a selected on or off position, and to provide a tripping mechanism rigidly connected to said latching rail means for operating said latch rail means into holding and releasing positions.

Another object of the invention is to provide a control device for exciting a tripping magnet to release, from a latching mechanism, individual selector switches corresponding to different measuring ranges of a multi-range measuring instrument.

Still another object of the invention is to provide a control equipment for actuating a tripping magnet to release individual keys of a key switch assembly when either a selected voltage or current of a respective measuring range is exceeded.

To these ends, in order to solve these objectives, the present invention provides an overload protection device for an electrical multi-range measuring instrument having several measuring ranges which, in accordance with the invention, is characterized by devices which serve to switch off the selector switches of the respective measuring ranges during overloading of that measuring range, and which also have signalling means to indicate the cut-off condition. The cut out is effected by selector switches, developed as mechanically mutually interlocking push-button switches, operated by a release or tripping magnet which is rigidly connected with a latch of the key assembly. The tripping magnet, however, is excited by an electronic or electro-magnetic control device which may lie within any measuring range and which has a relay coupled to its outlet side. An electronic switching amplifier (not shown) can be used instead of the last-mentioned relay.

According to another feature of the invention, it is also possible to combine the measuring ranges for the release or tripping device in such a way that the current measuring range and the voltage measuring range each have one electronic or electromagnetic control-device which act upon the tripping magnet. Preferably, a reclosing detent is provided at the key switches to prevent the reclosing of the respective measuring range circuit following the tripping action.

In accordance with a further feature of the present invention, the release or tripped condition of the keys is indicated by various means, which can include a visual signal, or optical or acoustic means. The optical means may constitute indicator signals, such as indicating lamps or other electro-illuminating objects. The acoustic means may be, for example, a humming buzzer, a sounding bell or a hooting horn device.

The foregoing and other objects, features and many of the attendant advantages of this invention will be readily appreciated as the same becomes better understood by reference to the following detailed description in conjunction with one embodiment of an apparatus according to the invention illustrated by way of example in the accompanying drawings, in which.

FIG. 1 illustartes, in plan view, a quadruple key switch in accordance with a perferred embodiment of the invention;

FIG. 2 is a lateral view, in cross section, of the key switch of FIG. 1;

FIG. 6 is a circuit diagram illustrating the tripper means control device and signalling means.

Figure 3:
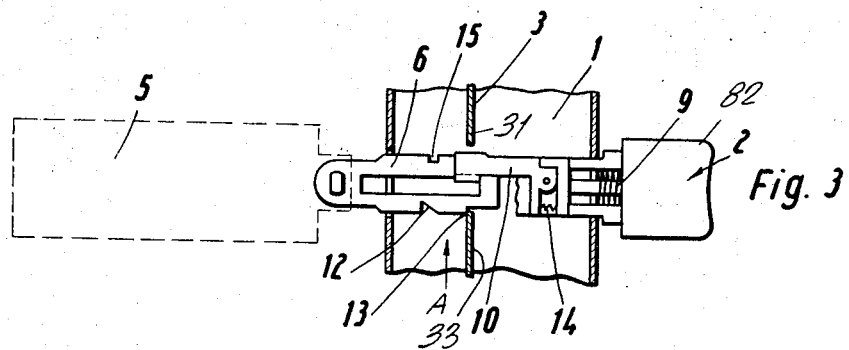
FIG. 3 is a fragmentary detail of the device of FIG. 1, showing, in plan view, a key in depressed condition.

As shown in the drawings, the quadruple key device illustrated in FIGS. 1 and 2 is for an electric multi-range measuring instrument containing an overload protection and is comprised mainly of a supporting frame 1, a plurality of push-type keys 2, a latch rail 3 supported on the frame for latching the keys 2, and a tripping magnet 4 rigidly connected with the latch rails for releasing the respective keys 2 from latched condtion in the latch rail 3. Individual switch members 5 are provided for each key 2, mechanically connected with cam sliders 6 of the respective keys 2. The switch members 5 carry electrical contact pieces (not shown in the drawing) which carry out the desired eletrical switching functions. The switch members 5 are equipped with return springs 7, which urge the switch members 5 into the illustrated off position of FIG. 1 following the release of the keys 2 by means of the tripping magnet 4. The latch rail 3 is brought into its off position of FIG. 1, i.e. its release position, toward the upper side of the frame 1, by a compression spring 8. The tripping magnet 4 is rigidly connected with the latch rail 3 at the upper end thereof. During each exctitation which occurs at each overload condition of the measuring instrument, a compression spring 8 (FIG. 1) engageable with a projection 81 in the latch rail 3 urges the rail 3 upwardly, as viewed in FIG. 1. Compression springs 9, located between the heads 12 of the keys 2 and the frame (see FIG. 2), serve to push the keys 2 to the right (FIG. 1) into their released positions of FIG. 1.

Figure 4:
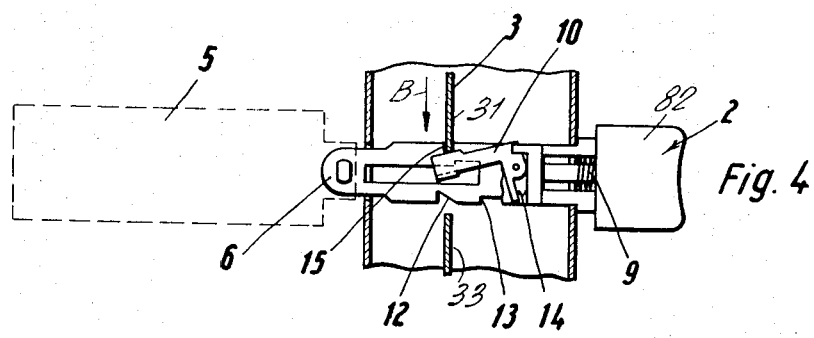
FIG. 4 illustrates the same detail as FIG. 3, but showing the key in its condition during response to the tripping magnet.
Figure 5:
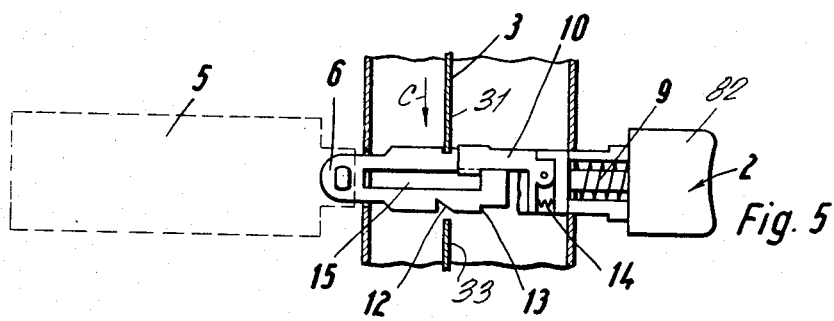
FIG. 5 illustrates a further position of the mechanism of FIG. 3, showing the reclosing detent mechanism in operation for blocking switching movement of the keys.

The respective cam sliders 6, for each key 2, are arranged between the heads 82 of the keys 2 and the individual switch members 5, and are capable of horizontal movement relative to the latch rail 3 (compare FIGS. 3 and 4). Each cam slider 6 is provided with a locking notch 15 along its upper edge engageable with a respective upper portion 31 of the latch rail 3 above the cam slider 6; and with a bevelled notch 12 along its lower edge engageable with a respective lower portion 33 of the latch rail. A reclosing detent 10, to prevent re-engagement of notch 15 with latch rail portion 31, is pivotally mounted on the keys 2 relative to the cam slider 6 and urged into the off position of FIG. 3 by a compression spring 14 on the key assembly 2.

Operation of the illustrated device of FIGS. 1–5 is as follows. The release operation of the keys 2 is best illustrated in detail in FIGS. 3, 4 and 5. During actuation of the individual switch members 5, the respective keys 2 are moved toward the left, as viewed in FIG. 1, and brought, along with their respective cam sliders 6, into contact with the respective contact pieces of the switch members 5. The latch rail 3, under urging of compression spring 8 against projection 81, thereof, slips out of the bevelled notch 12 and rail portion 33 is pushed behind the holding lug 13 and thereby arrest the cam slider 6 and the switch member 5. This arresting action can be accomplished either by hand or automatically (see FIG. 3). In carrying out the automatic release, the latch rail 3 and its projection 81 is moved down against the compression spring 8 by the release magnet 4. This causes the reclosing detent 10 which is pivotally mounted on keys 2 to cover and expose locking notch 15, and which is provided with a compression spring 14, to be lifted from the position of FIG. 4 to that of FIG. 5. By means of the return spring 7, the contact pieces of the pressed-in individual switch elements 5 are again returned to the right to their "off" or rest positions. Simultaneously, the latch rail 3, in its downward movement in the direction of arrow B of FIG. 4, locks into the off position of this switch member 5, by engaging (FIGS. 4, 5) a locking notch 15 in the respective cam slider 6 and by means of said engagement, which of necessity also involves the non-participating keys. The respective keys 2, and the switch members stay locked for as long as the excitation of the tripping magnet remains in effect (FIG. 5) (see arrows B and C of FIGS. 4 and 5).

Needless to say, although four keys 2 are shown in the illustrated example of FIG. 1, it is quite possible to install any desired number of push-type kyes 2 into the aforedescribed key assembly and to utilize the engagement of the latch rail 3 behind the corresponding holding lug 13 (FIG. 3) while key 2 is engaged, simultaneously for a mutual locking of the keys 2. Through the latch rail 3, which forcibly also engages the bevelled notch 12 in cam slider 6 of the remaining keys 2, a depressing movement of any additional key 2 will free the holding lug 13 of the depressed key, thereby releasing the associated switch member 5.

FIG. 6 illustrates a circuit diagram, showing means for the current responsive release of the depressed key and a tripper magnet control device, arranged for the respective current magnet ranges and the voltage ranges of meters A. This device may be comprised, especially in digital indicating devices, of electrical means, whose pulses are delivered to the tripping magnet 4, by means of a circuit which comprises a relay device 26, or other equivalent means for closing terminals 28, 30 to excite current from source 32 to tripper magnet 4.

FIG. 6 shows, in schematic form, the circuit diagram of the connections to the device according to the invention. Current from the load circuit 20 is fed through current transformer 22 and through one terminal 24 thereof to the tripper circuit control means 26, which in the illustrated embodiment of FIG. 6 is a relay which closes the normally open contacts 28 and 30 of the tripper magnet control circuit to cause current from the separate current source 32 to actuate the tripper magnet 4. Normally closed contacts 42, 44 of relay 26 then cause the signal means or lamp 46 to indicate when tripper magnet 4 is excited, which occurs when the relay or control means 26 closes the tripper circuit from source 32. From the tripper circuit control means 26, the connection line from terminal 24 continues and is connected to the respective terminals of a plurality of graduated resistances 34, 36, 38, 40 of different measuring ranges, whose respective measuring circuits to their respective meters A are closed by their individual push keys 2 to close the circuit to the other terminal 25 of current transformer 22 leading to the load circuit. Thus, the respective resistances 34, 36, 38, 40 and their meters A are connected to the load circuit 20 through terminals 134, 136, 138, 140.

It will be noted that the input measuring paths for resistances 34, 36, 38 and 40 all have equal voltages as measured across terminal pairs 134, 135; 136, 137; 138, 193; and 140, 141, namely substantially the same as the voltage across the transformer terminals 24, 25.

Thus, the present invention, whose object is an overload protection for an electrical multi-range meter, insures in any case that the valuable multi-range measuring device is protected against destruction even when its handling or operating personnel is inattentive or the key selection is faulty. The selector switches, particularly the key switches, cause various metering or resistance measuring inputs, which may be constructed to include various metering magnitudes, to be indicated in sequence, by key depression. At an overloading of the measuring circuit, the respective depressed key 2 is released by the tripping electromagnet 4 and the input current of the measuring device for example meter A, is thereby disconnected and separated from the measuring circuit.

We claim:

1. In an overload protective device for an electric multi-range measuring instrument having several measuring ranges capable of being switched on by means of selector switches; the improvement comprising, in combination:
    (a) a supporting frame,
    (b) a plurality of push-type keys movably mounted relative to and engageable with said frame and constructed to act simultaneously as overload switches,
    (c) selector switch means operably connected to said keys and tripped by overcurrent to cut off the measuring circuits,
    (d) latch means supported on said frame and mechanically engageable with said keys and with said switch means,
    (e) tripper magnet means for controlling the movement of said latch means and thus the movement of the measuring circuits,
    (f) and means responsive to overload of a respective measuring range of said selector switch means so as to release each key only when its measuring circuit is overloaded.

2. A device as set forth in claim 1, wherein said switch means comprise individual switch members mechanically connected with said frame and engageable with respective keys and with said individual switch members for latching and unlatching said keys into and out of engagement with said rail, said tripper means being excitable into tripped condition and including a tripper magnet jointed to said latching rail and capable of moving said rail upon excitation of said tripper means.

3. A device according to claim 1, further including indicator signal means operably connected to and responsive to a tripped condition of said tripper means and the released condition of said keys.

4. A device according to claim 1, said means responsive to overload condition including a control circuit responsive to an overload of a respective measuring range.

5. A device according to claim 4, including terminals for connection of said keys to a load circuit having a transformer, said control circuit having other terminals for current from said load circuit.

6. A device according to claim 5, said control circuit having means for connection to a source of power and means for closing said control circuit to excite said tripper magnet means.

7. A device according to claim 2, said switch members being provided with cam slider means, said cam slider means defining means for engaging said latch rail.

8. A device according to claim 7, said individual switch members having on and off positions, said means for engaging said latch rail comprising a locking notch for engaging a respective individual switch member with said latch rail in the off position of said switch member, so that said respective switch member remains in locked position relative to said locking notch as long as said tripping means remains in said tripped condition.

9. A device according to claim 7, said means for engaging said latch rail including holding lug means forming part of said cam slider means, said individual switch members having respective return springs for returning the respective switch members from a depressed condition back to their off positions while simultaneously moving said latch rail into locking engagement with a corresponding locking notch of a respective cam slider means.

10. A device according to claim 1, said means responsive to an overload condition including means for disconnecting the current input to a respective measuring circuit upon overload of a respective measuring circuit, said tripper magnet means being connected to cause release of a depressed key and to separate said key from said measuring circuit.

References Cited
UNITED STATES PATENTS

| | | | |
|---|---|---|---|
| 2,935,577 | 5/1960 | Dumke et al. | |
| 3,024,388 | 3/1962 | Blitchington | 324—110 |
| 3,464,012 | 8/1969 | Webb | 324—115 |

J D MILLER, Primary Examiner

H. FENDELMAN, Assistant Examiner

U.S. Cl. X.R.

324—110, 115